(12) United States Patent
Kusafuka et al.

(10) Patent No.: US 10,969,581 B2
(45) Date of Patent: Apr. 6, 2021

(54) DISPLAY APPARATUS, MOVING BODY AND LIGHT SOURCE APPARATUS HAVING A LIGHT SOURCE, LIQUID-CRYSTAL PANEL, BEAM SPLITTER, AND LIGHT GUIDING MEMBER

(71) Applicant: KYOCERA Corporation, Kyoto (JP)

(72) Inventors: Kaoru Kusafuka, Tokyo (JP); Yusuke Hayashi, Fort Lee, NJ (US); Satoshi Kawaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/328,638

(22) PCT Filed: Aug. 9, 2017

(86) PCT No.: PCT/JP2017/028951
§ 371 (c)(1),
(2) Date: Feb. 26, 2019

(87) PCT Pub. No.: WO2018/043082
PCT Pub. Date: Mar. 8, 2018

(65) Prior Publication Data
US 2019/0187468 A1    Jun. 20, 2019

(30) Foreign Application Priority Data

Aug. 29, 2016  (JP) .............................. JP2016-167333
Sep. 29, 2016  (JP) .............................. JP2016-192183

(51) Int. Cl.
*G02B 27/01* (2006.01)
*B60K 35/00* (2006.01)
*G02F 1/1333* (2006.01)
*G02B 27/28* (2006.01)
*G02F 1/13357* (2006.01)

(52) U.S. Cl.
CPC .......... *G02B 27/0101* (2013.01); *B60K 35/00* (2013.01); *G02B 27/01* (2013.01); *G02B 27/283* (2013.01); *G02F 1/1333* (2013.01); *G02F 1/133603* (2013.01); *G02F 1/133606* (2013.01); *B60K 2370/334* (2019.05);
(Continued)

(58) Field of Classification Search
CPC combination set(s) only.
See application file for complete search history.

(56) References Cited

U.S. PATENT DOCUMENTS 9,892,643 B2    2/2018  Aoki
2012/0050139 A1*  3/2012  Wang ................. G02B 27/0101
345/7
(Continued)

FOREIGN PATENT DOCUMENTS

CN    204687853 U    10/2015
JP    2008-076633 A    4/2008
(Continued)

*Primary Examiner* — Lauren Nguyen
(74) *Attorney, Agent, or Firm* — Studebaker & Brackett PC

(57) ABSTRACT

A liquid crystal panel includes a first transmissive member having a first face where light enters, a liquid crystal layer, and a second transmissive member having a second face where at least a part of light having passed through the first transmissive member and the liquid crystal layer exits. The second face is inclined relative to the liquid crystal layer.

12 Claims, 10 Drawing Sheets

(52) U.S. Cl.
   CPC .. *B60K 2370/52* (2019.05); *G02B 2027/0118* (2013.01); *G02F 2001/133607* (2013.01)

(56) References Cited

U.S. PATENT DOCUMENTS

| | | | | |
|---|---|---|---|---|
| 2014/0139754 | A1* | 5/2014 | Kobayashi | G02F 1/133553 349/5 |
| 2016/0018369 | A1* | 1/2016 | Ferrara | G01N 30/02 29/428 |
| 2016/0379498 | A1 | 12/2016 | Aoki | |
| 2017/0050564 | A1* | 2/2017 | Lv | H04N 7/183 |

FOREIGN PATENT DOCUMENTS

| | | |
|---|---|---|
| JP | 2015-118271 A | 6/2015 |
| JP | 2015-168382 A | 9/2015 |

\* cited by examiner

DISPLAY APPARATUS, MOVING BODY AND LIGHT SOURCE APPARATUS HAVING A LIGHT SOURCE, LIQUID-CRYSTAL PANEL, BEAM SPLITTER, AND LIGHT GUIDING MEMBER

CROSS-REFERENCE TO RELATED APPLICATION

This application claims priority from and the benefit of Japanese Patent Application Nos. 2016-167333 filed on Aug. 29, 2016 and 2016-192183 filed on Sep. 29, 2016, the entire contents of which are incorporated herein by reference.

TECHNICAL FIELD

This disclosure relates to a display apparatus, a moving body and a light source apparatus.

BACKGROUND

An apparatus that is mounted on a moving body such as a vehicle and allows a user such as a driver to visually recognize a virtual image is conventionally known. For example, a technique to control the light intensity of a light source depending on the ambient brightness is known.

SUMMARY

A liquid crystal panel according to an embodiment of this disclosure includes a first transmissive member, a liquid crystal layer and a second transmissive member. The first transmissive member has a first face. Light enters the first face. The second transmissive member has a second face. At least a part of the light having passed through the first transmissive member and the liquid crystal layer exits the second face. The second face is inclined relative to the liquid crystal layer.

A liquid crystal panel according to an embodiment of this disclosure includes a first transmissive member, a liquid crystal layer and a second transmissive member. The first transmissive member has a first face. Light enters the first face. The second transmissive member has a second face. At least a part of the light having passed through the first transmissive member and the liquid crystal layer exits the second face. At least a part of the light having passed approximately vertically through the liquid crystal layer is refracted at and exits the second face.

A liquid crystal display apparatus according to an embodiment of this disclosure includes a light source element and a liquid crystal panel. The light source element emits light. The liquid crystal panel is located in the direction along which the light emitted from the light source element travels. The liquid crystal panel includes a first transmissive member, a liquid crystal layer and a second transmissive member. The first transmissive member has a first face. Light from the light source element enters the first face. The second transmissive member has a second face. At least a part of the light having passed through the first transmissive member and the liquid crystal layer exits the second face. The second face is inclined relative to the liquid crystal layer.

A liquid crystal display apparatus according to an embodiment of this disclosure includes a light source element and a liquid crystal panel. The light source element emits light. The liquid crystal panel is located in the direction along which the light emitted from the light source element travels. The liquid crystal panel includes a first transmissive member, a liquid crystal layer and a second transmissive member. The first transmissive member has a first face. Light from the light source element enters the first face. The second transmissive member has a second face. At least a part of the light having passed through the first transmissive member and the liquid crystal layer exits the second face. At least a part of the light having passed approximately vertically through the liquid crystal layer is refracted at and exits the second face.

A display apparatus according to an embodiment of this disclosure includes a light source element, a liquid crystal panel and one or more optical members. The light source element emits light. The liquid crystal panel is located in the direction along which the light emitted from the light source element travels. The liquid crystal panel has a first transmissive member, a liquid crystal layer and a second transmissive member. The first transmissive member has a first face. Light from the light source element enters the first face. The second transmissive member has a second face. At least a part of the light having passed through the first transmissive member and the liquid crystal layer exits the second face. The one or more optical members allow the light having exited the second face to reach a predetermined region in a real space. The second face is inclined relative to the liquid crystal layer.

A display apparatus according to an embodiment of this disclosure includes a light source element, a liquid crystal panel and one or more optical members. The light source element emits light. The liquid crystal panel is located in the direction along which the light emitted from the light source element travels. The liquid crystal panel includes a first transmissive member, a liquid crystal layer and a second transmissive member. The first transmissive member has a first face. Light from the light source element enters the first face. The second transmissive member has a second face. At least a part of the light having passed through the first transmissive member and the liquid crystal layer exits the second face. The one or more optical members allow the light having exited the second face to reach a predetermined region in a real space. At least a part of the light having passed approximately vertically through the liquid crystal layer is refracted at and exits the second face.

A moving body according to an embodiment of this disclosure includes a light source element, a liquid crystal panel and one or more optical members. The light source element emits light. The liquid crystal panel is located in the direction along which the light emitted from the light source element travels. The liquid crystal panel includes a first transmissive member, a liquid crystal layer and a second transmissive member. The first transmissive member has a first face. Light from the light source element enters the first face. The second transmissive member has a second face. At least a part of the light having passed through the first transmissive member and the liquid crystal layer exits the second face. The one or more optical members allow the light having exited the second face to reach a predetermined region in a real space. The second face is inclined relative to the liquid crystal layer.

A moving body according to an embodiment of this disclosure includes a light source element, a liquid crystal panel and one or more optical members. The light source element emits light. The liquid crystal panel is located in the direction along which the light emitted from the light source element travels. The liquid crystal panel includes a first transmissive member, a liquid crystal layer and a second transmissive member. The first transmissive member has a first face. Light from the light source element enters the first face. The second transmissive member has a second face. At least a part of the light having passed through the first transmissive member and the liquid crystal layer exits the second face. The one or more optical members allow the light having exited the second face to reach a predetermined region in a real space. At least a part of the light having passed approximately vertically through the liquid crystal layer is refracted at and exits the second face.

A light source apparatus according to an embodiment of this disclosure includes a light source element, a liquid crystal panel, a beam splitter and a light guiding member. The light source element emits light. The liquid crystal panel is located in the progressive direction in a light path of the light emitted from the light source element. The beam splitter is located in the progressive direction of the liquid crystal panel. The beam splitter is inclined relative to a plane vertical to the progressive direction. The liquid crystal panel has a first face and a second face. Light from the light source element enters the first face. Image projection light resulting from polarization of the light having entered the first face in a predetermined polarization direction exits the second face. The beam splitter allows the image projection light having exited the second face of the liquid crystal panel and traveling in the progressive direction to pass through and also reflects external light traveling in the retrograde direction opposite to the progressive direction in the direction different from the progressive direction. The light guiding member guides and allows the external light reflected by the beam splitter to enter the first face of the liquid crystal panel.

A display apparatus according to an embodiment of this disclosure allows a user to visually recognize a virtual image of an image. The display apparatus includes a light source element, a liquid crystal panel, a beam splitter, one or more optical members and a light guiding member. The light source element emits light. The liquid crystal panel is located in the progressive direction in a light path of the light emitted from the light source element. The beam splitter is located in the progressive direction of the liquid crystal panel. The beam splitter is inclined relative to a plane vertical to the progressive direction. The liquid crystal panel has a first face and a second face. Light from the light source element enters the first face. Image projection light resulting from polarization of the light having entered the first face in a predetermined polarization direction exits the second face. The beam splitter allows the image projection light having exited the second face of the liquid crystal panel and traveling in the progressive direction to pass through and reflects external light traveling in the retrograde direction opposite to the progressive direction in the direction different from the progressive direction. The one or more optical members allow the image projection light having passed through the beam splitter to reach a predetermined region in a real space. The light guiding member guides and allows the external light reflected by the beam splitter to enter the first face of the liquid crystal panel.

A moving body according to an embodiment of this disclosure allows a user to visually recognize a virtual image of an image. The moving body includes a light source element, a liquid crystal panel, a beam splitter, one or more optical members and a light guiding member. The light source element emits light. The liquid crystal panel is located in the progressive direction in a light path of the light emitted from the light source element. The beam splitter is located in the progressive direction of the liquid crystal panel. The beam splitter is inclined relative to a plane vertical to the progressive direction. The liquid crystal panel has a first face and a second face. Light from the light source element enters the first face. Image projection light resulting from polarization of the light having entered the first face in a predetermined polarization direction exits the second face. The beam splitter allows the image projection light having exited the second face of the liquid crystal panel and traveling in the progressive direction to pass through and reflects external light traveling in the retrograde direction opposite to the progressive direction in the direction different from the progressive direction. The one or more optical members allow the image projection light having passed through the beam splitter to reach a predetermined region in a real space. The light guiding member guides and allows the external light reflected by the beam splitter to enter the first face of the liquid crystal panel.

DETAILED DESCRIPTION

Improvement of convenience is conventionally desired for an apparatus configured to allow a user to visually recognize a virtual image. According to a liquid crystal panel, a liquid crystal display apparatus, a display apparatus, a moving body and a light source apparatus of an embodiment of this disclosure, convenience is improved. Embodiments of this disclosure will be described below with reference to drawings.

Embodiment 1

Figure 1:
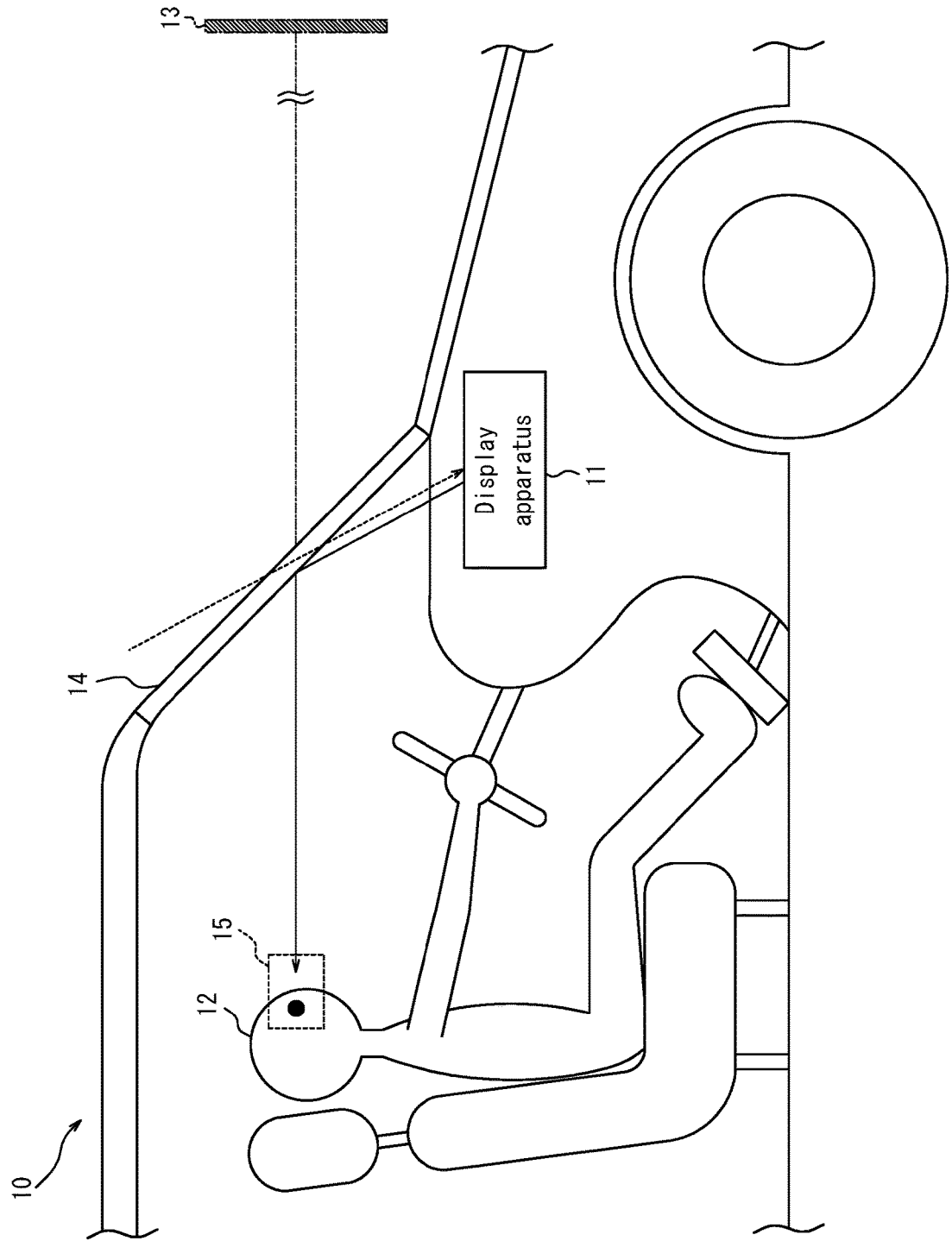
FIG. 1 is a diagram illustrating a moving body and a display apparatus according to Embodiment 1 of this disclosure.

A moving body 10 and a display apparatus 11 according to Embodiment 1 will be described with reference to FIG. 1. The moving body 10 is provided with a display apparatus 11.

The moving body 10 may include, for example, vehicles, ships, aircrafts and the like. Vehicles may include, for example, automobiles, industrial vehicles, rail vehicles, campers, fixed-wing airplanes running on runway, and the like. Automobiles may include, for example, passenger cars, trucks, buses, two-wheel vehicles, trolleybuses and the like. Industrial vehicles may include, for example, agricultural and construction industrial vehicles and the like. Industrial vehicles may include, for example, forklifts, golf carts and the like. Agricultural industrial vehicles may include, for example, tractors, tillers, transplanters, binders, combines, lawn mowers and the like. Construction industrial vehicles may include, for example, bulldozers, scrapers, loading shovels, crane vehicles, dump trucks, road rollers and the like. Vehicles may include human-powered vehicles. Vehicle classification is not limited to the above described examples. For example, automobiles may include industrial vehicles that can travel on the road. Same vehicle may be included in some categories. Ships may include, for example, jet ski bikes, boats, tankers and the like. Aircrafts may include, for example, fixed-wing airplanes, rotor-wing airplanes and the like.

The display apparatus 11 may be disposed at any positions in the moving body 10. The display apparatus 11 may be disposed in a dashboard of the moving body 10, for example. The display apparatus 11 serves as a part of a head-up display that allows a user 12 such as a driver of the moving body 10, for example, to visually recognize a virtual image 13 of a desired image. More specifically, in an embodiment, the display apparatus 11 emits image projection light toward a predetermined region of a first optical member 14 provided in the moving body 10. In an embodiment, the first optical member 14 may be a windshield. In another embodiment, the first optical member 14 may be a combiner. When the display apparatus 11 has the first optical member 14, the display apparatus 11 serves as a head-up display. Details of the image projection light will be described later. The image projection light reflected by a predetermined region of the first optical member 14 arrives at an eye box 15. The eye box 15 is a region in a real space where eyes of the user 12 are supposed to be present in light of a build, a posture, a change in the posture and the like of the user 12, for example. The solid arrow in FIG. 1 illustrates a path along which a part of the image projection light emitted from the display apparatus 11 arrives at the eye box 15. Hereinafter a path along which the light travels is also referred to as a light path. When eyes are present in the eye box 15, the user 12 can visually recognize a virtual image 13 of an image by the image projection light arrived at the eye box 15. The virtual image 13 can be visually recognized in front of the moving body 10, for example. The display apparatus 11, in cooperation with the first optical member 14, allows the user 12 such as a driver of the moving body 10 to visually recognize the virtual image 13 of the desired image.

For example, external light such as sunlight and the like may pass through the first optical member 14 and enter the display apparatus 11 along a path in the direction opposite to the path along which the image projection light travels. The dashed arrow in FIG. 1 illustrates a path of the external light entering the display apparatus 11. Details of the external light entering the display apparatus 11 will be described later.

(Configuration of Display Apparatus)

Figure 2:
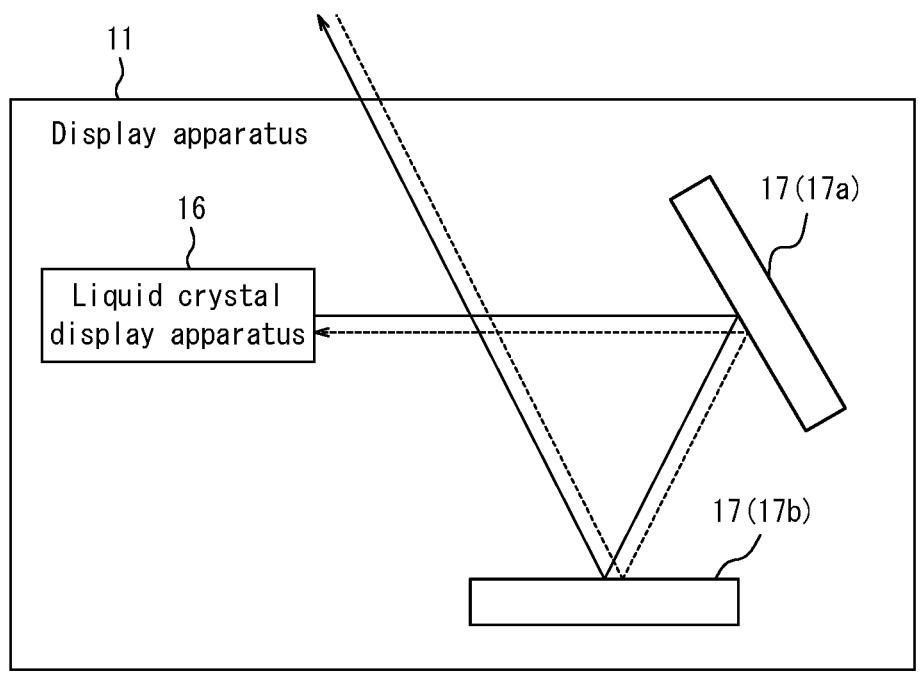
FIG. 2 is a diagram illustrating a schematic configuration of the display apparatus in FIG. 1.

The display apparatus 11 according to an embodiment will be described in detail with reference to FIG. 2. The display apparatus 11 includes a liquid crystal display apparatus 16 and one or more second optical members 17. FIG. 2 illustrates a configuration in which the display apparatus 11 includes two second optical members 17a and 17b. FIG. 2 schematically illustrates an example of configuration of the display apparatus 11. For example, the size, the shape and the arrangement and the like of the display apparatus 11 and each component of the display apparatus 11 are not limited to the example illustrated in FIG. 2.

The liquid crystal display apparatus 16 emits image projection light in the display apparatus 11. The detailed configuration of the liquid crystal display apparatus 16 will be described later.

The second optical member 17 allows the image projection light emitted from the liquid crystal display apparatus 16 to arrive at the outside of the display apparatus 11. In the example illustrated in FIG. 2, the second optical members 17a and 17b allow the image projection light emitted from the liquid crystal display apparatus 16 to arrive at the outside of the display apparatus 11. In an embodiment, at least one of the second optical members 17a and 17b may be a mirror. The solid arrow in FIG. 2 illustrates a path indicating that a part of the image projection light emitted from the liquid crystal display apparatus 16 is reflected by the second optical members 17a and 17b, passes through a window provided in a housing of the display apparatus 11 and arrives at the outside of the display apparatus 11. The image projection light arrived at the outside of the display apparatus 11 arrives at a predetermined region of the first optical member 14 provided in the moving body 10, as illustrated in FIG. 1. In another embodiment, at least one of the second optical members 17a and 17b may be a lens. In another embodiment, one of the second optical members 17a and 17b may be a mirror and the other may be a lens.

Furthermore, the second optical members 17a and 17b may serve as an expansion optical system that expands the image projection light. In an embodiment, at least one of the second optical members 17a and 17b may be a mirror having a convex or concave shape at least a part on the face where the image projection light arrives at. In another embodiment, at least one of the second optical members 17a and 17b may be a lens having a convex or concave shape at least a part on the face where the image projection light enters or exits. At least a part of the convex shape and the concave shape may be sphere or non-sphere.

As described above, the external light having entered the display apparatus 11 may, in the display apparatus 11, enter the liquid crystal display apparatus 16 by a path opposite to the path along which the image projection light travels. The dashed arrow in FIG. 2 illustrates a path of the external light that enters the liquid crystal display apparatus 16. The external light entering the liquid crystal display apparatus 16 will be described in detail later.

(Configuration of Liquid Crystal Display Apparatus)

Figure 3:
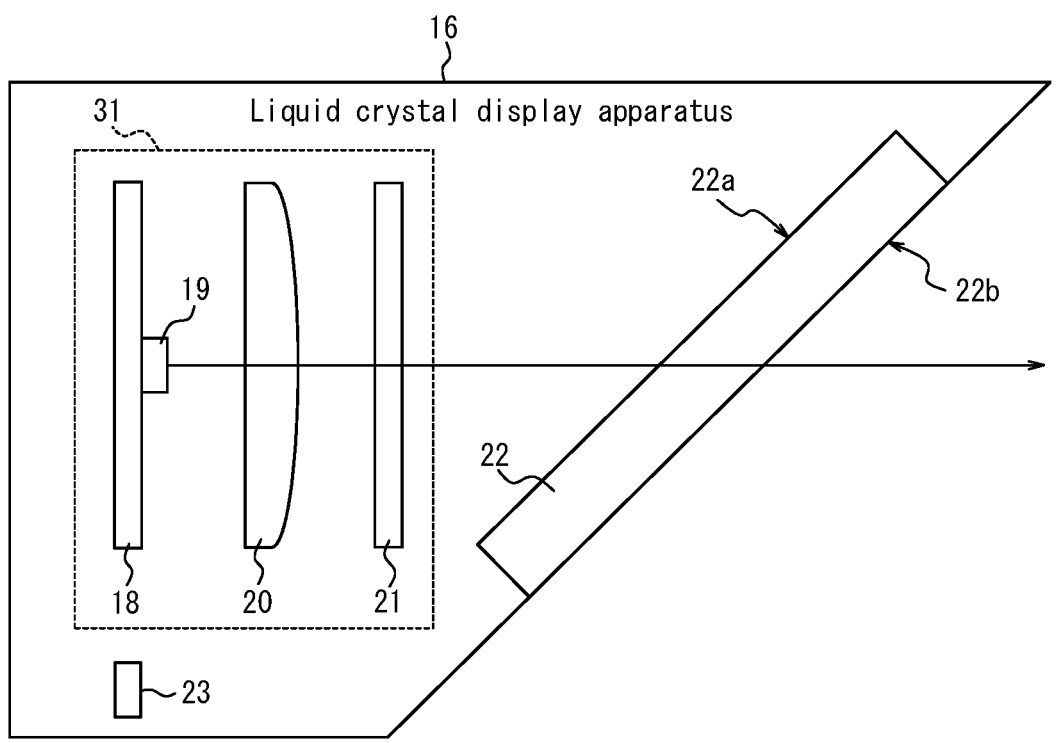
FIG. 3 is a cross-sectional view along an optical axis of a liquid crystal display apparatus in FIG. 2.

Details of the liquid crystal display apparatus 16 according to an embodiment will be described with reference to FIG. 3. The liquid crystal display apparatus 16 includes a substrate 18, a light source element 19, a third optical member 20, a fourth optical member 21, a liquid crystal panel 22 and a controller 23. The substrate 18, the light source element 19, the third optical member 20 and the fourth optical member 21 may be configured as one light source apparatus 31. In this case, the liquid crystal display apparatus 16 may include the liquid crystal panel 22 and the controller 23. The substrate 18, the third optical member 20, the fourth optical member 21 and the liquid crystal panel 22 may be fixedly disposed in the liquid crystal display apparatus 16. The light source element 19 may be disposed on the substrate 18. FIG. 3 schematically illustrates an example of a configuration of the liquid crystal display apparatus 16. For example, the size, the shape and the arrangement and the like of the liquid crystal display apparatus 16 and each component of the liquid crystal display apparatus 16 are not limited to the example illustrated in FIG. 3.

The light source element 19 includes one or more Light Emitting Diodes (LED) or a laser apparatus and the like. The light source element 19 may emit light according to the control of the controller 23. The light source element 19 may include a plurality of light emitting diodes, the colors of lights emitted from respective diodes being different from each other. In FIG. 3, the solid arrow extending from the light source element 19 schematically illustrates a path along which a part of the light emitted from the light source element 19 travels. Hereinafter at least a part of the light emitted from the light source element 19 is also referred to merely as the light from the light source element 19. In FIG. 3, the light path of the light passing through the liquid crystal panel 22 is schematically illustrated. The details of the light path of the light passing through the liquid crystal panel 22 will be described later.

The third optical member 20 is located, with respect to the position of the light source element 19, in the direction along which the light from the light source element 19 travels. For example, in FIG. 3, the third optical member 20 is located to the right of the light source element 19. The third optical member 20 includes a collimator lens, for example. The third optical member 20 collimates light entering from the light source element 19. The collimated light may be the light traveling in approximately parallel to the optical axial direction of the third optical member 20.

The fourth optical member 21 is located, with respect to the position of the third optical member 20, in the direction along which the light from the light source element 19 travels. For example, in FIG. 3, the fourth optical member 21 is located to the right of the third optical member 20. The fourth optical member 21 includes a lens, for example. In an embodiment, the fourth optical member 21 may include a Fresnel lens. The fourth optical member 21 is fixedly disposed in the liquid crystal display apparatus 16 such that the optical axis of the fourth optical member 21 is approximately aligned with the optical axis of the third optical member 20. Hereinafter the optical axis of the third optical member 20 or the optical axis of the fourth optical member 21 is also referred to as the optical axis of the liquid crystal display apparatus 16 or the optical axis of the light source apparatus 31. In an embodiment, the progressive direction of the image projection light emitted from the liquid crystal display apparatus 16 and the optical axis direction of the liquid crystal display apparatus 16 may be approximately parallel to each other. The fourth optical member 21 may refract at least a part of the light having passed through and collimated by the third optical member 20 in a desired progressive direction.

The liquid crystal panel 22 includes a transmissive liquid crystal device such as a Liquid Crystal Display (LCD), for example. The liquid crystal panel 22 is located in the direction along which the light from the light source element 19 travels with respect to the position of the fourth optical member 21. For example, in FIG. 3, the liquid crystal panel 22 is located to the right of the fourth optical member 21. In an embodiment, as illustrated in FIG. 3, for example, the light source element 19, the third optical member 20, the fourth optical member 21 and the liquid crystal panel 22 may be disposed, in this order, along the optical axis of the liquid crystal display apparatus 16. The light emitted from the light source element 19 and having passed through the fourth optical member 21 enters the first face 22a of the liquid crystal panel 22. The light emitted from the light source apparatus 31 enters the liquid crystal panel 22 from the first face 22. With respect to the liquid crystal panel 22, the first face 22a may be a face where the light from the light source apparatus 31 enters. The first face 22a may be a face where the light from the light source apparatus 31 is received. The first face 22a may be a face located on the light source side in a light path extending from the light source element 19 to the user 12. At least a part of the light having passed through the liquid crystal panel 22 exits the second face 22b of the liquid crystal panel 22. The second face 22b is a face that emits light that is emitted from the light source apparatus 31 and passed through the liquid crystal layer 26. The second face 22b may be a face located on the user 12 side in the light path extending from the light source element 19 to the user 12. In an embodiment, the first face 22a may face the inside of the liquid crystal display apparatus 16. The second face 22b may face the outside of the liquid crystal display apparatus 16. Hereinafter the light exiting the second face 22b of the liquid crystal panel 22 is referred to also as the image projection light.

(Configuration of Liquid Crystal Panel)

Figure 4:
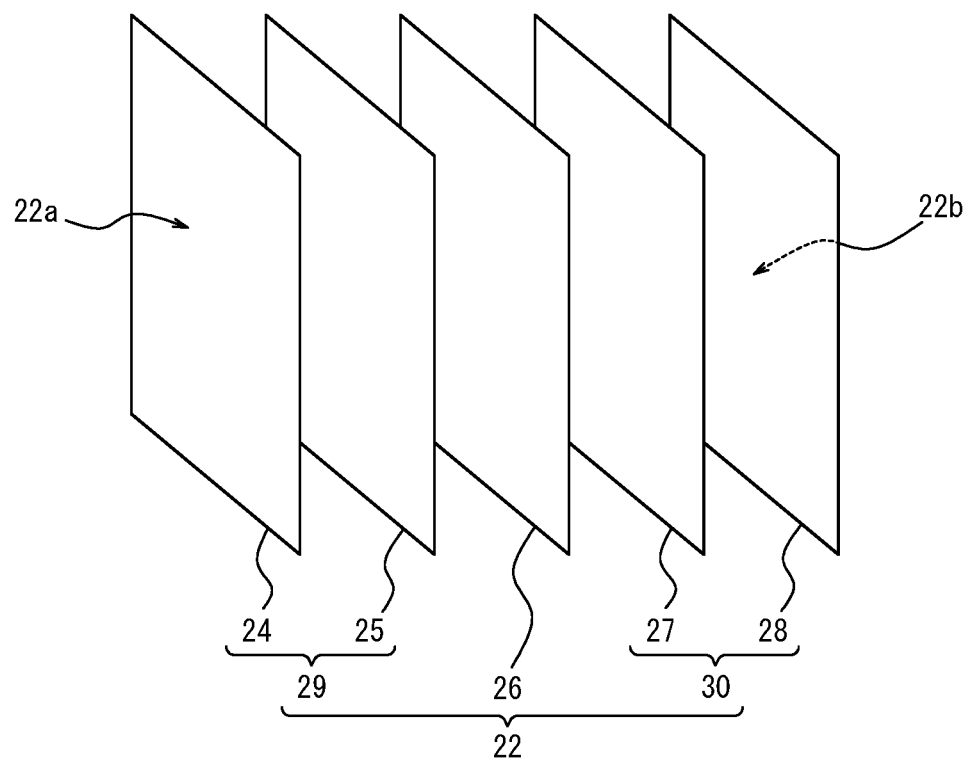
FIG. 4 is a diagram illustrating a schematic configuration of a liquid crystal panel in FIG. 3.

Configuration of the liquid crystal panel 22 according to an embodiment will be described in detail. As illustrated in FIG. 4, for example, the liquid crystal panel 22 includes a first polarizing plate 24, a first substrate 25, a liquid crystal layer 26, a second substrate 27 and a second polarizing plate 28. The first substrate 25 may include a transparent electrode and an oriented film. The second substrate 27 may include a transparent electrode and an oriented film. In an embodiment, the first polarizing plate 24 may have the first face 22a. The second polarizing plate 28 may have the second face 22b. Hereinafter the first polarizing plate 24 and the first substrate 25 are collectively also referred to as a first transmissive member 29. The second substrate 27 and the second polarizing plate 28 are collectively also referred to as a second transmissive member 30. The liquid crystal panel 22 may include a light diffusion plate, a reflective plate and a color filter. The light diffusion plate, the reflective plate and the color filter may be located on inside or outside of the first polarizing plate 24, the first substrate 25, the second substrate 27 and the second polarizing plate 28. For example, in the liquid crystal panel where the diffusion plate is located on the light source element 19 side of the first polarizing plate 24, the face on the light source element 19 side of the diffusion plate may be defined as the first face. For example, in the liquid crystal panel where the reflective plate is located on the user 12 side of the second polarizing plate 28, for example, the face on the user 12 side of the reflective plate may be defined as the second face.

FIG. 4 schematically illustrates an example of a configuration of the liquid crystal panel 22. For example, in FIG. 4, each of components integrally provided in practice is illustrated separately. Additional members may be present between two components. The size, the shape, the thickness and the like of each liquid crystal panel 22 and each component of the liquid crystal panel 22 are not limited to those of the example illustrated in FIG. 4. The liquid crystal panel 22 can display a variety of images when a voltage is applied to the liquid crystal layer 26. Actuation of the liquid crystal layer 26 may be controlled by the controller 23, for example.

Figure 5:
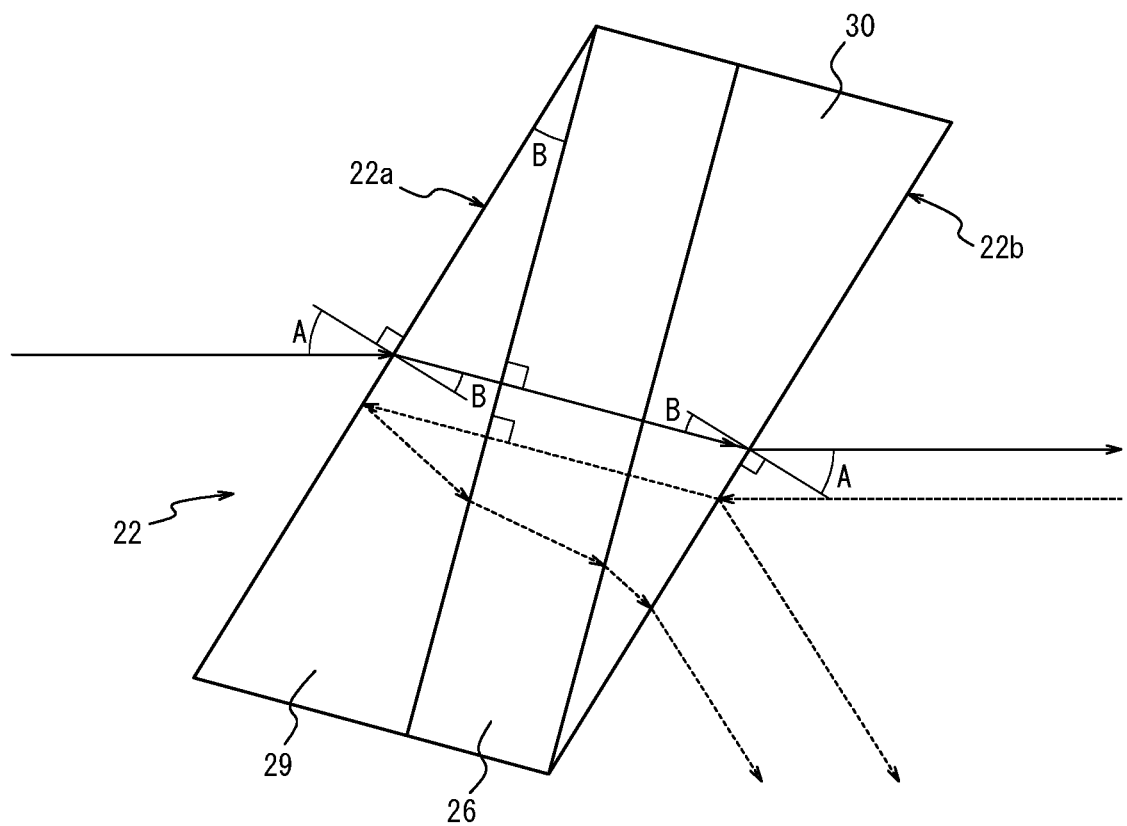
FIG. 5 is a cross sectional view of the liquid crystal panel in FIG. 3.

In an embodiment, the liquid crystal panel 22 is configured such that at least a part of the light having passed approximately vertically through the liquid crystal layer 26 is refracted at and exits the second face 22b. For example, as illustrated in FIG. 5, the second face 22b of the second transmissive member 30 may be inclined relative to the liquid crystal layer 26. The second transmissive member 30 may be inclined relative to the boundary with the liquid crystal layer 26. The thickness of the second transmissive member 30 may depend on the position. When the thickness of the second transmissive member 30 is different depending on the position, the second face 22b is inclined relative to the face that forms a counterpart to the second face 22b. For example, with respect to the second transmissive member 30, the thickness thereof is adjusted such that the second face 22b is inclined relative to the liquid crystal layer 26. The second transmissive member 30 configured in the above described manner may be realized by obliquely polishing the second substrate 27 with respect to the liquid crystal layer 26 after the first substrate 25, the liquid crystal layer 26 and the second substrate 27 are integrally formed. The light having passed through the liquid crystal layer 26 is refracted when passing between the second substrate 27 and the second polarizing plate 28 and when being exits the second face 22b. The second transmissive member 30 configured in the above described manner may be realized by attaching the second polarizing plate 28 whose thickness is different depending on the position to the second substrate 27.

In an embodiment, the first transmissive member 29 is configured such that at least a part of the light having entered the first face 22a is refracted at the first face 22a and enters approximately vertically the liquid crystal layer 26. For example, the first face 22a of the first transmissive member 29 may be inclined relative to the liquid crystal layer 26. The first transmissive member 29 may be inclined relative to the boundary with the liquid crystal layer 26. The thickness of the first transmissive member 29 may be different depending on the position. When the thickness of the first transmissive member 29 is different depending on the position, the first face 22a is inclined relative to the face that forms a counterpart to the first face 22a.

In an embodiment, as described above, the liquid crystal panel 22 is configured such that the second face 22b that is inclined relative to the liquid crystal layer 26 and the first face 22a are approximately parallel to each other. For example, the thickness of the first transmissive member 29 and that of the second transmissive member 30 may be adjusted respectively such that the first face 22a and the second face 22b are approximately parallel to each other. For example, after the first substrate 25, the liquid crystal layer 26 and the second substrate 27 are integrally formed, both of the first substrate 25 and the second substrate 27 may be obliquely polished simultaneously relative to the liquid crystal layer 26. For example, the first polarizing plate 24 whose thickness is different depending on the position may be applied to the first substrate 25. The second polarizing plate 28 whose thickness is different depending on the position may be applied to the second substrate 27.

(Arrangement of Liquid Crystal Panel)

Arrangement of the liquid crystal panel 22 in the liquid crystal display apparatus 16 will be described in detail. FIG. 5 illustrates a cross-sectional view of the liquid crystal panel 22 where the second face 22b inclined relative to the liquid crystal layer 26 and the first face 22a are approximately parallel to each other. The solid arrow in FIG. 5 indicates a light path along which the light emitted from the light source element 19 and having passed through the third optical member 20 and the fourth optical member 21 passes through the liquid crystal panel 22.

In an embodiment, the liquid crystal panel 22 is fixedly disposed in the liquid crystal display apparatus 16 such that the normal line direction of the second face 22b is inclined relative to the progressive direction of the image projection light emitted from the liquid crystal display apparatus 16. According to such configuration, as described below, the probability is reduced that the external light entering the liquid crystal display apparatus 16 and reflected by the liquid crystal panel 22 travels in the progressive direction of the image projection light emitted from the liquid crystal display apparatus 16.

The dashed arrow in FIG. 5 illustrates a path along which the external light entering the liquid crystal display apparatus 16 travels. More specifically, as illustrated in FIG. 2, for example, the external light entering the display apparatus 11 is reflected by or refracted at one or more second optical members 17 and travels opposite to the progressive direction of the image projection light emitted from the liquid crystal display apparatus 16. In FIG. 2, the external light reflected by two second optical members 17 travels leftward. The external light travelling in the retrograde direction enters the liquid crystal display apparatus 16.

The second face 22b of the liquid crystal panel 22 reflects at least a part of the external light traveling in the retrograde direction. The external light reflected by the second face 22b travels in the direction that is different from the progressive direction of the image projection light emitted from the liquid crystal display apparatus 16. According to such configuration, a decrease in the visibility of the virtual image 13 is reduced. More specifically, if the external light reflected by the liquid crystal panel 22 travels in the progressive direction of the image projection light, the external light arrives at the eye box 15 and may enter the eyes of the user 12. When the external light enters the eyes of the user 12, the visibility of the virtual image 13 may be reduced, for example. According to the liquid crystal panel 22 of an embodiment, the probability is reduced that the external light reflected by the second face 22b of the liquid crystal panel 22 travels in the progressive direction of the image projection light, and thus a decrease in the visibility of the virtual image is reduced.

The second face 22b may refract a part of the external light traveling in the retrograde direction. The external light refracted at the second face 22b travels, in the liquid crystal panel 22, approximately vertically relative to the liquid crystal layer 26. The external light traveling in the liquid crystal panel 22 may enter the first face 22a. The external light entering the first face 22a may be reflected by the first face 22a. As described above, the first face 22a is inclined relative to the liquid crystal layer 26. Therefore, the external light reflected by the first face 22a travels, in the liquid crystal panel 22, in the direction different from the direction approximately vertical to the liquid crystal layer 26. Thus, the external light reflected by the first face 22a and refracted at and exits the second face 22b travels in the direction different from the progressive direction of the image projection light. According to the liquid crystal panel 22 of an embodiment, since the probability is reduced that the external light reflected by the first face 22a of the liquid crystal panel 22 travels in the progressive direction of the image projection light, a decrease in the visibility of the virtual image 13 is reduced.

In an embodiment, the liquid crystal panel 22 is fixedly disposed in the liquid crystal display apparatus 16 such that the light emitted from the light source element 19 and traveling approximately parallel to the optical axis of the liquid crystal display apparatus 16 will enter the first face 22a at an incident angle A. For example, the incident angle A may be represented by the following formula.

$$A[\text{rad}] = \sin^{-1}(n \cdot \sin B) \quad (1)$$

Here, B is an inclination [rad] of the first face 22a relative to the liquid crystal layer 26 and is equal to an angle of refraction, and n is an index of refraction of the first transmissive member 29 with respect to the ambient medium of the liquid crystal panel 22.

The light entering the first face 22a at an incident angle A and refracted thereby travels in the first transmissive member 29 in the direction approximately vertical to the liquid crystal layer 26. The light passes approximately vertically through the liquid crystal layer 26. The light having passed through the liquid crystal layer 26 travels in the second transmissive member 30 and enters the second face 22b at an incident angle B. In an embodiment, the index of refraction of the first transmissive member 29 may be approximately the same as that of the second transmissive member 30. In this case, the light having entered the second face 22b at an incident angle B exits the second face 22b at an emission angle A.

The controller 23 includes one or more processors. The processor may include a general-purpose processor that reads in a specific program to execute a specific function and a processor dedicated to a specific processing. The dedicated processor may include Application Specific Integrated Circuit (ASIC). The processor may include Programmable Logic Device (PLD). The PLD may include Field-Programmable Gate Array (FPGA). The controller 23 may be either System-on-a-Chip (SoC) in which one or more processors corporate with each other or System In a Package (SiP). The controller 23 controls overall operation of the light source apparatus 31. For example, the controller 23 controls the driving power of the light source element 19 to allow the light source element 19 to emit light. The driving power control of the light source element 19 may include current control, voltage control and Pulse Width Modulation (PWM) control. When the light source element 19 includes a plurality of light emitting diodes, the colors of lights emitted from respective diodes being different from each other, the controller 23 may adjust the color of the light source element 19. Color adjustment of the light source element 19 may include a driving power control performed with respect to each light emitting diode. The controller 23 allows the liquid crystal panel 22 to display an image. Images may include characters or graphics.

As described above, in the liquid crystal display apparatus 16 according to an embodiment, the second face 22b of the liquid crystal panel 22 is inclined relative to the liquid crystal layer 26. Therefore, at least a part of the light passing substantially vertically through the liquid crystal layer 26 is refracted at and exits the second face 22b. Thus, as described below, since a decrease in the visibility of the virtual image 13 is reduced, the convenience of the liquid crystal panel 22, the liquid crystal display apparatus 16, the display apparatus 11 and the moving body 10 is improved.

Two factors for causing decrease in visibility of the virtual image 13 will be described. First, when the external light traveling in the retrograde direction opposite to the progressive direction of the image projection light is reflected by the second face 22b of the liquid crystal panel 22 and travels in the progressive direction of the image projection light, it can reach the eye box 15. Thus, as described above, the visibility of the virtual image 13 may decline. Secondly, when the light emitted from the light source element 19 and traveling in the liquid crystal panel 22 passes through the liquid crystal layer 26, as an inclination of the progressive direction of the light from the direction vertical to the liquid crystal layer 26 increases, the brightness of the image projection light emitted from the second face 22b decreases. When the brightness of the image projection light decreases, the virtual image 13 is dimmed, and the visibility of the virtual image 13 may decline.

In order to decrease a decline in the visibility of the virtual image 13 caused by the first factor, the external light traveling opposite to the progressive direction of the image projection light may enter the second face 22b of the liquid crystal panel 22 at an incident angle≠0 [rad], for example. In other words, the image projection light may be exits the second face 22b of the liquid crystal panel 22 at an emission angle≠0 [rad]. On the other hand, in order to decrease a decline in the visibility of the virtual image 13 caused by the second factor, the light emitted from the light source element 19 and passing approximately vertically through the liquid crystal layer 26 may be exits the second face 22b. Therefore, in order to decrease the decline in the visibility caused by the first factor and the decline in the visibility caused by the second factor at the same time, the light emitted from the light source element 19 and passing approximately vertically through the liquid crystal layer 26 may be exits the second face 22b at an emission angle≠0 [rad].

In the liquid crystal display apparatus 16 according to an embodiment, the second face 22b of the liquid crystal panel 22 is inclined relative to the liquid crystal layer 26. Thus, at least a part of the light passing approximately vertically through the liquid crystal layer 26 is refracted at and exits the second face 22b at an emission angle≠0 [rad]. According to such configuration, since the decline in the visibility caused by the first factor and that caused by the second factor are decreased at the same time, the convenience of the liquid crystal panel 22, the liquid crystal display apparatus 16, the display apparatus 11 and the moving body 10 is improved.

In the liquid crystal display apparatus 16 according to an embodiment, the first face 22a of the liquid crystal panel 22 may be inclined relative to the liquid crystal layer 26. According to such configuration, out of the external light entering the second face 22b, the external light refracted at the second face 22b, traveling in the liquid crystal panel 22 and reflected by the first face 22a exits the second face 22b in the direction different from the progressive direction of the image illumination light. Therefore, the probability is reduced that the external light traveling opposite to the progressive direction of the image projection light will be reflected by the first face 22a of the liquid crystal panel 22 and travel in the progressive direction of the image projection light. Thus, since a decline in the visibility of the virtual image 13 due to the external light reflected by the first face 22a of the liquid crystal panel 22 is reduced, the convenience of the liquid crystal panel 22, the liquid crystal display apparatus 16, the display apparatus 11 and the moving body 10 is further improved.

Embodiment 2

Figure 9:
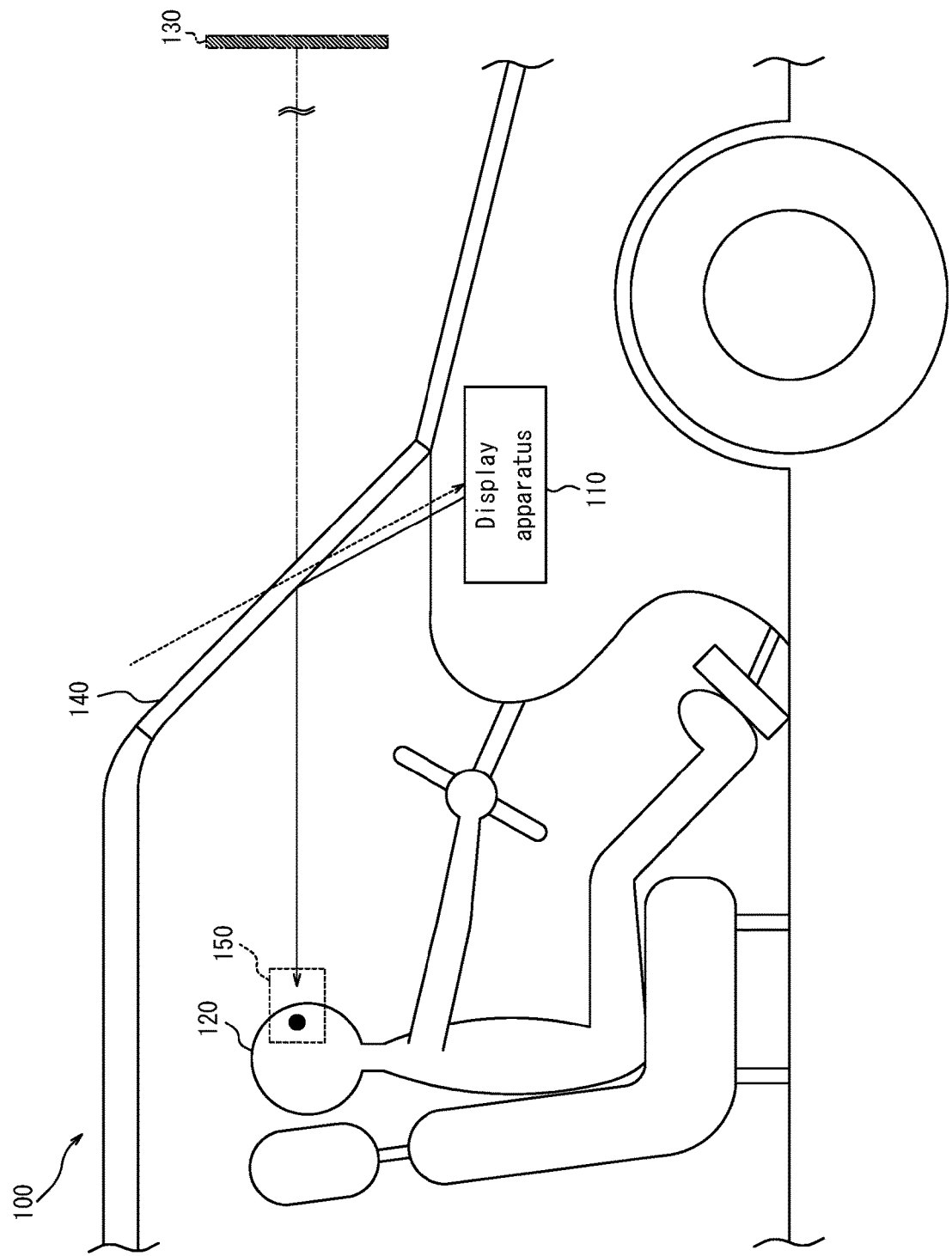
FIG. 9 is a diagram illustrating a moving body and a display apparatus according to Embodiment 2 of this disclosure.

A moving body 100 and a display apparatus 110 according to an embodiment are described with reference to FIG. 9. The moving body 100 is provided with the display apparatus 110.

The display apparatus 110 may be disposed at any position in the moving body 100. The display apparatus 110 may be disposed in a dashboard of the moving body 100, for example. The display apparatus 110 serves as a head-up display that allows a user 120 such as a driver of the moving body 100, for example, to visually recognize a virtual image 130 of a desired image. More specifically, in an embodiment, the display apparatus 110 emits image projection light toward a predetermined region of a fifth optical member 140 provided in the moving body 100. In an embodiment, the fifth optical member 140 may be a windshield. In another embodiment, the fifth optical member 140 may be a combiner. The details of the image projection light will be described later. The image projection light reflected by the predetermined region of the fifth optical member 140 arrives at an eye box 150. The eye box 150 is an area in a real space where eyes of the user 120 are assumed to be present in light of a build, a posture, a change in the posture and the like of the user 120, for example. The solid arrow in FIG. 9 illustrates a path along which a part of the image projection light emitted from the display apparatus 110 arrives at the eye box 150. When eyes are present in the eye box 150, the user 120 can visually recognize the virtual image 130 of the image by the image projection light arrived at the eye box 150. The virtual image 130 may be visually recognized in front of the moving body 100, for example.

Here, for example, the external light such as sunlight and the like may pass through the fifth optical member 140 and enter the display apparatus 110 along a path opposite to the path along which the image projection light travels. The dashed arrow in FIG. 9 illustrates a path along which the external light enters the display apparatus 110. Details of the external light entering the display apparatus 110 will be described later.

(Configuration of Display Apparatus)

Figure 10:
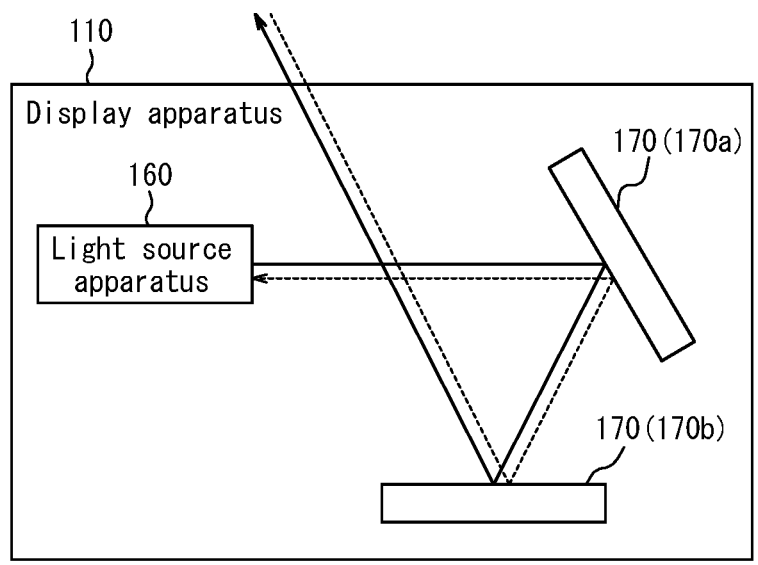
FIG. 10 is a diagram illustrating a schematic configuration of the display apparatus in FIG. 9.

The display apparatus 110 according to an embodiment will be described in detail with reference to FIG. 10. The display apparatus 110 includes a light source apparatus 160 and one or more sixth optical members 170. FIG. 10 illustrates a configuration in which the display apparatus 110 is provided with two sixth optical members 170a and 170b.

The light source apparatus 160 emits image projection light in the display apparatus 110. The detailed configuration of the light source apparatus 160 will be described later.

The sixth optical members 170a and 170b allow the image projection light emitted from the light source apparatus 160 to reach the outside of the display apparatus 110. In an embodiment, at least one of the sixth optical members 170a and 170b may be a mirror. The solid arrow illustrated in FIG. 10 indicates a path along which a part of the image projection light emitted from the light source apparatus 160 is reflected by the sixth optical members 170a and 170b, passes through a window provided in the housing of the display apparatus 110 and reaches the outside of the display apparatus 110. The image projection light reached the outside of the display apparatus 110 reaches a predetermined region of the fifth optical member 140 provided in the moving body 100, as illustrated in FIG. 9. In another embodiment, at least one of the sixth optical members 170a and 170b may be a lens. In another embodiment, one of the sixth optical members 170a and 170b may be a mirror and the other may be a lens.

Furthermore, the sixth optical members 170a and 170b may serve as an expansion optical system that expands the image projection light. In an embodiment, at least one of the sixth optical members 170a and 170b may be a mirror having a convex or a concave shape at least a part on the surface where the image projection light arrives at. In another embodiment, at least one of the sixth optical members 170a and 170b may be a lens having a convex or a concave shape at least a part on the surface where the image projection light enters or exits. At least a part of the convex shape and the concave shape may be sphere or non-sphere.

Here, as described above, the external light entering the display apparatus 110 may enter the light source apparatus in the display apparatus 110 along a path opposite to the path along which the image projection light travels. The dashed arrow illustrated in FIG. 10 is a path along which the external light enters the light source apparatus 160. The details of the external light entering the light source apparatus 160 will be described later.

(Configuration of Light Source Apparatus)

Figure 11:
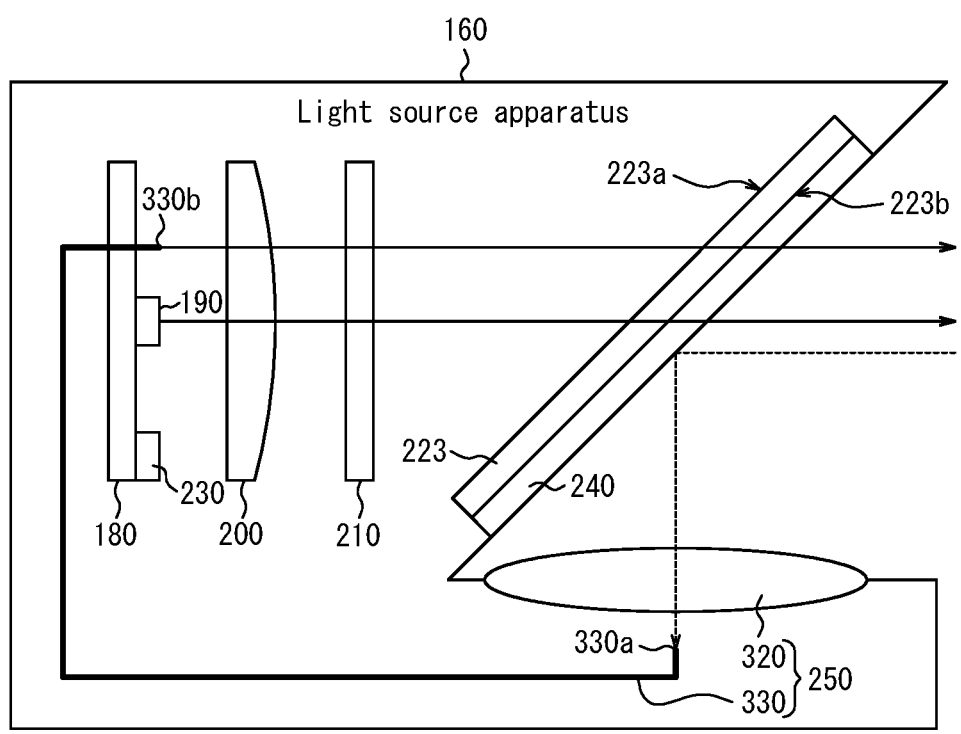
FIG. 11 is a cross-sectional view along an optical axis of a light source apparatus in FIG. 10.

The light source apparatus 160 according to an embodiment will be described in detail with reference to FIG. 11. The light source apparatus 160 includes a substrate 180, a light source element 190, a seventh optical member 200, an eighth optical member 210, a liquid crystal panel 223, a beam splitter 240, a controller 230 and a light guiding member 250. The substrate 180, the seventh optical member 200, the eighth optical member 210, the liquid crystal panel 223 and the light guiding member 250 are fixedly disposed in the light source apparatus 160. The light source element 190 and the controller 230 are disposed on the substrate 180.

The light source element 190 includes one or more Light Emitting Diodes (LED) or a laser apparatus and the like, for example. The light source element 190 emits light according to the control by the controller 230. The light source element 190 may include a plurality of light emitting diodes, the colors of lights emitted from respective light emitting diodes being different from each other. In FIG. 11, the solid arrow extending from the light source element 190 illustrates a path along which a part of the light emitted from the light source element 190 travels. In an embodiment, the progressive direction of the light emitted from the light source element in the light path is approximately coincident with the first direction.

The seventh optical member 200 is located in the first direction (the right direction in FIG. 11) of the light source element 190. The seventh optical member 200 includes a collimator lens, for example. The seventh optical member 200 collimates the light having entered from the light source element 190. The collimated light is approximately parallel light traveling in the optical axis direction of the seventh optical member 200.

The eighth optical member 210 is located in the first direction of the seventh optical member 200. The eighth optical member 210 includes a lens, for example. In an embodiment, the eighth optical member 210 may include a Fresnel lens. The eighth optical member 210 is fixedly disposed in the light source apparatus 160 such that the optical axis of the eighth optical member 210 is approximately aligned with the optical axis of the seventh optical member 200. Hereinafter the optical axis of the seventh optical member 200 (or the eighth optical member 210) is also referred to as an optical axis of the light source apparatus 160. In an embodiment, the above described first direction and the optical axial direction of the light source apparatus 160 are approximately parallel to each other. The eighth optical member 210 refracts the light having passed through and collimated by the seventh optical member 200 in a desired progressive direction.

The liquid crystal panel 223 includes a transmissive liquid crystal device such as a Liquid Crystal Display (LCD), for example. The liquid crystal panel 223 is located in the first direction of the eighth optical member 210. Therefore, as illustrated in FIG. 11, for example, the light source element 190, the seventh optical member 200, the eighth optical member 210 and the liquid crystal panel 223 are disposed, in this order, along the optical axis of the light source apparatus 160. The liquid crystal panel 223 can display a variety of images by a liquid crystal layer driven according to the control by the controller 230. The liquid crystal panel 223 transmits or shields the light having passed through the eighth optical member 210 by the liquid crystal layer, and thus emits the image projection light to the outside of the light source apparatus 160. More specifically, the light from the light source element 190 enters the first face 223a of the liquid crystal panel 223 via the seventh optical member 200 and the eighth optical member 210. At least a part of the light having entered the first face 223a of the liquid crystal panel 223 is polarized in a predetermined polarization direction in the liquid crystal layer driven according to the control by the controller 230 and passes through the liquid crystal layer. Linear polarized light having passed through the liquid crystal layer exits a second face 223b of the liquid crystal panel 223. Hereinafter the linear polarized light emitted from the second face 223b of the liquid crystal panel 223 is also referred to as image projection light.

In an embodiment, the second face 223b of the liquid crystal panel 223 is inclined relative to a plane vertical to the first direction. In another embodiment, the second face 223b of the liquid crystal panel 223 may be approximately vertical to the first direction.

The beam splitter 240 is located in the first direction of the liquid crystal panel 223. The beam splitter 240 divides the light having obliquely entered relative to the beam splitter 240 into two. In an embodiment, the beam splitter 240 may be a polarization beam splitter configured to, out of the light having entered, allow a component of the first polarization direction to pass through and reflect a component of the second polarization direction orthogonal to the first polarization direction. The beam splitter 240 may be a half mirror, for example. In an embodiment, the beam splitter 240 is disposed such that it is inclined relative to a plane vertical to the first direction. Thus, the image projection light emitted from the second face 223b of the liquid crystal panel 223 and traveling in the first direction obliquely enters the beam splitter 240. The beam splitter 240 is disposed such that the first polarization direction is approximately coincident with the polarization direction of the entering image projection light. Therefore, the beam splitter 240 allows the image projection light emitted from the liquid crystal panel 223 and traveling in the first direction to pass through. In an embodiment, the beam splitter 240 and the second face 223b of the liquid crystal panel 223 may be in contact or separate with each other. In an embodiment, the liquid crystal panel 223 and the beam splitter 240 may be integrally formed such that the beam splitter 240 and the second face 223b of the liquid crystal panel 223 may be in contact with each other. In an embodiment, the beam splitter 240 may be formed into a sheet and may be attached to the second face 223b of the liquid crystal panel 223.

As described above, the beam splitter 240 reflects at least a part of the external light having entered the light source apparatus 160. The dashed arrow in FIG. 11 illustrates a path along which at least a part of the external light entering the light source element 190 travels. More specifically, as illustrated in FIG. 10, for example, the external light entering the display apparatus 110 is reflected by or refracted at one or more second optical elements and travels in the second direction (to the left in FIG. 10) opposite to the first direction. In an embodiment, the retrograde direction opposite to the progressive direction of the light emitted from the light source element in the light path is approximately coincident with the second direction. The external light traveling in the second direction enters the light source apparatus 160. Out of the external light traveling in the second direction, the beam splitter 240 allows a component of the first polarization direction to pass through and reflects a component of the second polarization direction. As described above, the external light having passed through the beam splitter 240 is reflected by the second face 223b of the liquid crystal panel 223 inclined relative to the plane vertical to the first direction and travels in the direction other than the first direction. On the other hand, the external light reflected by the beam splitter 240 travels in the direction other than the first direction. In an embodiment, the progressive direction of the external light reflected by the second face 223b of the liquid crystal panel 223 may be approximately coincident with that of the external light reflected by the beam splitter 240. For example, the external light reflected by the second face 223b of the liquid crystal panel 223 and the light reflected by the beam splitter 240 travel respectively in the third direction (downward direction in FIG. 11) that is different from the first direction. In another embodiment, the progressive direction of the external light reflected by the second face 223b of the liquid crystal panel 223 and the progressive direction of the external light reflected by the beam splitter 240 may be different from each other.

The controller 230 includes one or more processors. The processors may include a general-purpose processor that reads in a specific program to execute a specific function and a processor dedicated to a specific processing. The dedicated processor may include Application Specific Integrated Circuit (ASIC). The processor may include Programmable Logic Device (PLD). The PLD may include Field-Programmable Gate Array (FPGA). The controller 230 may be either System-on-a-Chip (SoC) in which one or more processors corporate with each other or System In a Package (SiP). The controller 230 controls overall operation of the light source apparatus 160. For example, the controller 230 controls the driving power of the light source element 190 to allow the light source element 19 to emit light. The driving power control of the light source element 190 may include current control, voltage control and Pulse Width Modulation (PWM) control. When the light source element 190 includes a plurality of light emitting diodes, the colors of the light emitted being different from each other, the controller 230 may adjust the color of the light source element 190. Color adjustment of the light source element 190 may include a driving power control performed with respect to each light emitting diode. The controller 230 allows the liquid crystal panel 223 to display an image. The image may include characters or graphics.

The light guiding member 250 guides and allows the external light reflected by the beam splitter 240 to enter the first face 223a of the liquid crystal panel 223. In an embodiment, the light guiding member 250 includes a lens 320 configured to collect external light reflected by the beam splitter 240 and an optical fiber 330 configured to allow the collected external light to enter a first end 330a and to emit the external light from a second end 330b. In an embodiment, the second end 330b of the optical fiber 330 may be disposed in the vicinity of the light source element 190. In the vicinity of the optical element is a position where the light from the second end 330b of the optical fiber 330 is emitted in the same space where the light from the optical element is emitted, for example. In this case, in addition to the light from the light source element 190, the light from the second end 330b of the optical fiber 330 enters the first face 223a of the liquid crystal panel 223 via the seventh optical member 200 and the eighth optical member 210. In FIG. 11, the solid arrow extending from the second end 330b of the optical fiber 330 indicates a path along which a part of the light emitted from the second end 330b travels.

In another embodiment, the light guiding member 250 may further include a diffusion member connected to the second end 330b of the optical fiber 330. The diffusion member may include a light diffusion plate or a light diffusion fiber, for example. The diffusion member diffuses the external light emitted from the second end 330b of the optical fiber 330. In this case, in addition to the light from the light source element 190, the light from the diffusion member enters the first face 223a of the liquid crystal panel 223 via the seventh optical member 200 and the eighth optical member 210. When the diffusion member includes a light diffusion fiber, the light diffusion fiber may be bent such that it covers around the light source element 190, for example, and may be disposed on the substrate 180.

In another embodiment, the light source apparatus 160 may further include a diffusion plate between the eighth optical member 210 and the liquid crystal panel 223.

As described above, according to the light source apparatus 160 of an embodiment, the beam splitter 240 allows the image projection light emitted from the liquid crystal panel 223 and traveling in the first direction to pass through and reflects the external light traveling in the second direction opposite to the first direction in the direction different from the first direction. According to such configuration, as described below, the light source apparatus 160 with improved convenience is realized.

For example, unlike the light source apparatus 160 according to an embodiment, assuming that, in the light source apparatus, the second face 223b of the liquid crystal panel 223 is approximately vertical to the first direction and the beam splitter 240 is not provided. In this case, the external light entering the light source apparatus is reflected by the second face 223b of the liquid crystal panel 223 and travels in the first direction. The external light reflected by the liquid crystal panel 223 and traveling in the first direction is emitted from the light source apparatus along with the image projection light. Thus, if the light source apparatus including no beam splitter 240 is adopted, since the external light reflected by the liquid crystal panel 223 reaches the eye box 150, the visibility of the virtual image 130 is decreased.

On the other hand, according to the light source apparatus 160 of an embodiment, since the external light having entered the light source apparatus 160 is reflected in the direction different from the first direction, the possibility that the reflected external light reaches the eye box 150 is decreased. Since the visibility of the virtual image 130 is decreased, the convenience of the light source apparatus 160 and of the display apparatus 110 and the moving body 100 provided with the light source apparatus 160 is improved.

Furthermore, according to the light source apparatus 160 of an embodiment, the light guiding member 250 guides and allows the external light reflected by the beam splitter 240 to enter the first face 223a of the liquid crystal panel 223. With such configuration, as with the light from the light source element 190, the external light entering the light source apparatus 160 can be used as what is called back light. Thus the brightness of the image projection light is increased and the visibility of the virtual image 130 is improved. Moreover, when the light entering the liquid crystal panel 223 from the light guiding member 250 is bright enough, even if the emission intensity of the light source element 190 is weak, the visibility of the virtual image 130 is maintained. In the light source apparatus 160, the amount of power to drive the light source element 190 can be reduced. Therefore, the convenience of the light source apparatus 160 and of the display apparatus 110 and the moving body 100 provided with the light source apparatus 160 is improved.

In an embodiment, the second face 223b of the liquid crystal panel 223 may be inclined relative to a plane vertical to the first direction. With such configuration, even if a part of the external light entering the light source apparatus 160 and traveling in the second direction passes through the beam splitter 240, the external light having passed through the beam splitter 240 is reflected by the second face 223b of the liquid crystal panel 223 and travels in the direction different from the first direction. Therefore, a decrease in the visibility of the virtual image 130 is reduced, and thus the convenience of the light source apparatus 160 and of the display apparatus 110 and the moving body 100 provided with the light source apparatus 160 is improved.

Although this disclosure has been described on the basis of the figures and the embodiments, it is to be understood that various changes and modifications may be implemented on the basis of this disclosure by those who are ordinarily skilled in the art. Accordingly, such changes and modifications are included in the scope of the disclosure herein. For example, functions and the like included in each means, each step and the like may be rearranged without logical inconsistency. A plurality of means or steps can be combined into one or divided.

Figure 6:
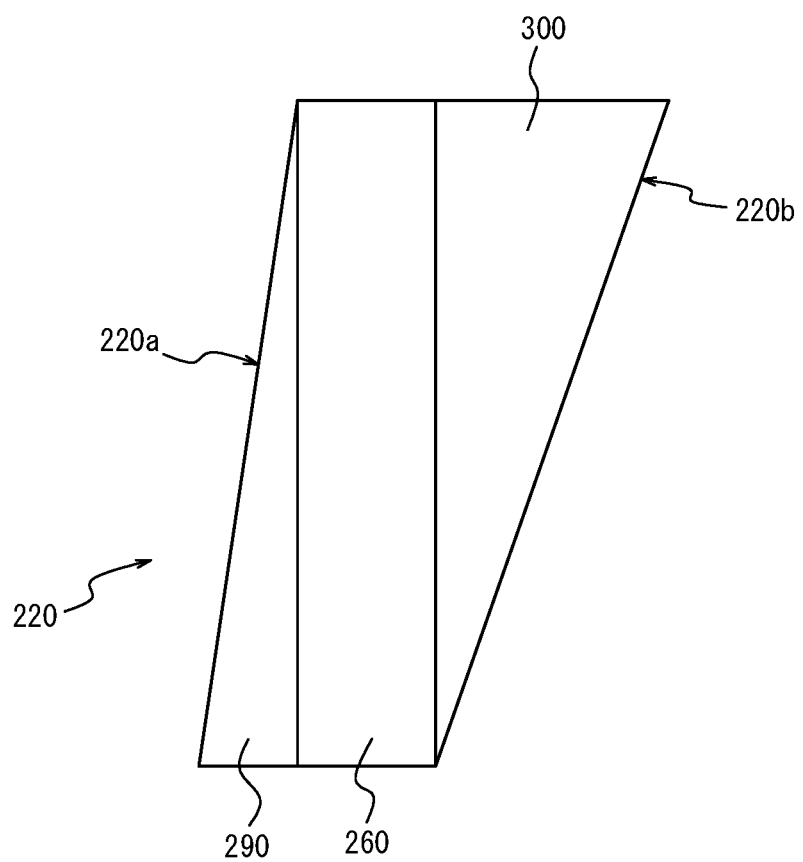
FIG. 6 is a cross-sectional view of a liquid crystal panel according to Variation 1 of Embodiment 1 of this disclosure.
Figure 7:
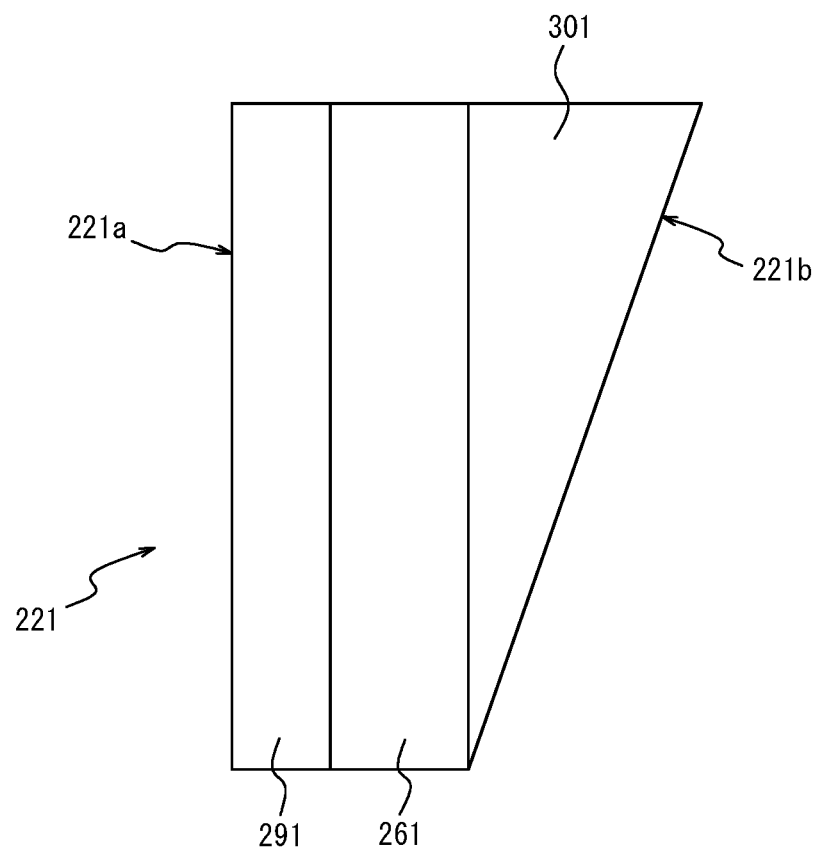
FIG. 7 is a cross-sectional view of a liquid crystal panel according to Variation 2 of Embodiment 1 of this disclosure.
Figure 8:
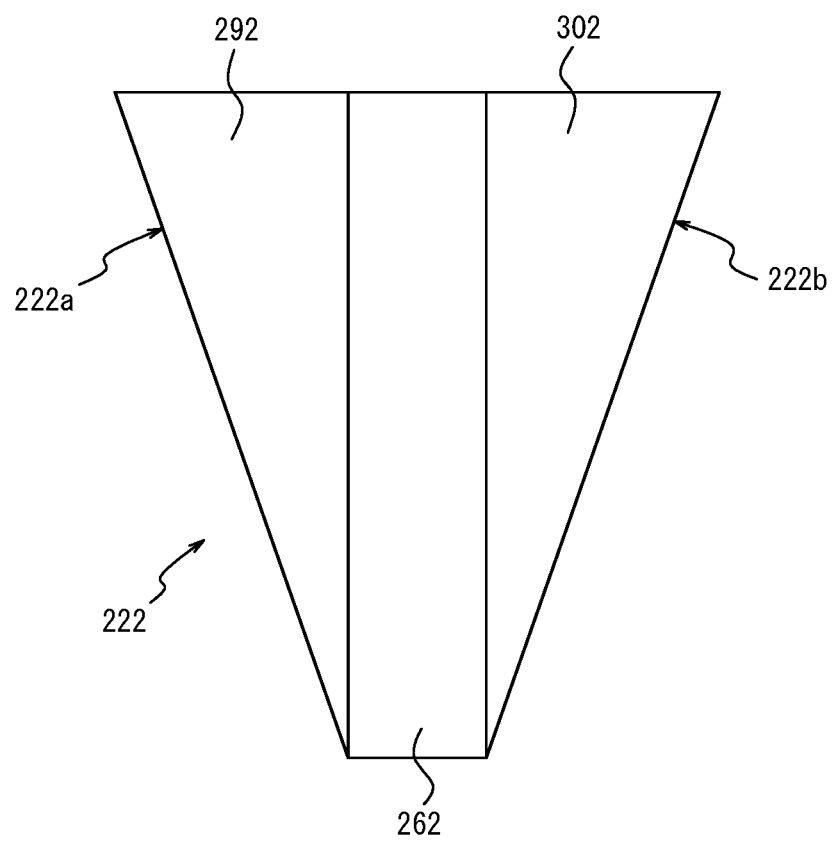
FIG. 8 is a cross-sectional view of a liquid crystal panel according to Variation 3 of Embodiment 1 of this disclosure.

For example, in the above described Embodiment 1, the first face 22a of the liquid crystal panel 22 and the second face 22b that is inclined relative to the liquid crystal layer 26 are approximately parallel to each other. However, it is enough if the second face 22b is inclined relative to the liquid crystal layer 26, and it is not essential that the first face 22a and the second face 22b are approximately parallel to each other. For example, in the liquid crystal panel 220 illustrated in FIG. 6, the absolute value of the angle formed by the liquid crystal layer 260 and the first face 220a is smaller than that formed by the liquid crystal layer 260 and the second face 220b. For example, in the liquid crystal panel 221 illustrated in FIG. 7, the first face 221a is parallel to the liquid crystal layer 261, and on the other hand the second face 221b is inclined relative to the liquid crystal layer 261. For example, in the liquid crystal panel 222 illustrated in FIG. 8, although the absolute value of the angle formed by the liquid crystal layer 262 and the first face 222a is equal to the absolute value of the angle formed by the liquid crystal layer 262 and the second face 222b, the first face 222a and the second face 222b are not approximately parallel to each other. Even if any of the above described liquid crystal panels 220, 221 and 222 is adopted, as with the above described embodiment, a decrease in the visibility of the virtual image 13 can be reduced.

For example, in the liquid crystal panel 22 according to the above described Embodiment 1, the first polarizing plate 24, the first substrate 25, the liquid crystal layer 26, the second substrate 27 and the second polarizing plate 28 are integrally formed. However, each component of the liquid crystal panel 22 may be separated. For example, at least one of the first polarizing plate 24 and the second polarizing plate 28 may be separated from the liquid crystal panel 22.

For example, in the above described Embodiment 2, the moving body 100 may further include a polarizing filter on the fourth face of the fifth optical member 140 (for example, the windshield), the fourth face being different from the third face that reflects image projection light. The third face is a face of the fifth optical member 140 opposed to the inner space of the moving body 100. The fourth face is a face of the fifth optical member 140 opposed to the outer space of the moving body 100. Out of the light entering, the polarizing filter attenuates or shields a component of a predetermined polarization direction. The polarizing filter is provided on the fourth face of the fifth optical member 140 such that the predetermined polarization direction is approximately coincident with the polarization direction of the image projection light that reaches the fifth optical member 140. According to the above described configuration, out of the external light passing through the polarizing filter and the fifth optical member 140 and entering the display apparatus 110, a component of the same polarization direction as the image projection light is attenuated or shielded. Therefore, out of the external light entering the display apparatus 110 and reaching the beam splitter 240 of the light source apparatus 160, the amount of the external light that passes through the beam splitter 240 approaches zero. For example, unlike the above described embodiment, even if the second face 223*b* of the liquid crystal panel 223 is approximately vertical to the first direction, the external light having passed through the beam splitter 240, reflected by the second face 223*b* of the liquid crystal panel 223 and traveling in the first direction approaches zero. Thus, as with the above described embodiment, a decrease in the visibility of the virtual image 130 is reduced and the design freedom with respect to the direction of the second face 223*b* of the liquid crystal panel 223 is improved, and thus the convenience of the moving body 100 is further improved.

In the above described Embodiment 2, the light source apparatus 160 may further include a first sensor configured to detect brightness of an image displayed by the liquid crystal panel 223, that is, brightness of the image projection light. The first sensor may include a photodetector such as a photodiode or a photo transistor, for example. The first sensor may be disposed in the first direction of the liquid crystal panel 223 or the beam splitter 240, for example, of the light source apparatus 160. The controller 230 controls the driving power of the light source element 190 depending on the detection value of the first sensor. More specifically, when the detection value of the first sensor is a threshold or more, the controller 230 decreases the amount of power to drive the light source element 190 to reduce the brightness of the light from the light source element 190. As described above, the image projection light includes the light from the light source element 190 and the light from the light guiding member 250. According to such configuration, when the light from the light guiding member 250 is bright enough, for example, the amount of power to drive and the light emission of the light source element 190 are decreased. Thus, the convenience of the light source apparatus 160 and of the display apparatus 110 and the moving body 100 provided with the light source apparatus 160 is further improved. In another embodiment, the first sensor may be provided in the display apparatus 110 or the moving body 100, instead of the light source apparatus 160.

In the above described Embodiment 2, the light source apparatus 160 may further include a second sensor configured to detect color temperatures of the external light entering the first face 223*a* of the liquid crystal panel 223 from the light guiding member 250 or of the photosynthesis of the external light and the light from the light source element 190. The second sensor may include a color thermometer, for example. In the light source apparatus 160, the second sensor may be disposed in a space between the substrate 180 and the seventh optical member 200, for example. The controller 230 adjusts the color of the light source element 190 depending on the detection value of the second sensor. More specifically, on the basis of the detection value of the second sensor, the controller 230 controls the driving power of each light emitting diode included in the light source element 190 such that each of R, G, and B will be a desired percent value, for example. According to such configuration, change of the color tone of the image projection light from a desired color tone due to the external light entering the first face 223*a* of the liquid crystal panel 223 from the light guiding member 250 can be reduced, for example. Thus, the convenience of the light source apparatus 160 and of the display apparatus 110 and the moving body 100 provided with the light source apparatus 160 is further improved.

The invention claimed is:

1. A light source apparatus, comprising:
  a light source element configured to emit light;
  a liquid crystal panel located in a progressive direction in a light path of light emitted from the light source element;
  a beam splitter located in the progressive direction of the liquid crystal panel and is inclined relative to a plane vertical to the progressive direction; and
  a light guiding member, wherein
  the liquid crystal panel has a first face where light from the light source element enters and a second face where image projection light resulting from polarization of light having entered the first face in a predetermined polarization direction exits,
  the beam splitter allows the image projection light having exited the second face of the liquid crystal panel and traveling in the progressive direction to pass through, and reflects external light traveling in a retrograde direction opposite to the progressive direction in a direction different from the progressive direction, and
  the light guiding member is positioned to receive the external light reflected by the beam splitter and to emit the received external light into the liquid crystal panel by way of the first face of the liquid crystal panel.

2. The light source apparatus according to claim 1, wherein the second face of the liquid crystal panel is inclined relative to a plane vertical to the progressive direction.

3. The light source apparatus according to claim 1, wherein the beam splitter is a polarization beam splitter configured to allow light in the predetermined polarization direction to pass through.

4. The light source apparatus according to claim 1, wherein the second face of the liquid crystal panel and the beam splitter are in contact with each other.

5. The light source apparatus according to claim 1, wherein
  the light guiding member includes:
    an optical member configured to collect external light reflected by the beam splitter; and
    an optical fiber having a first end where external light collected by the optical member enters and a second end where external light having entered the first end exits, and
  external light having exited the second end of the optical fiber enters the first face of the liquid crystal panel.

6. The light source apparatus according to claim 5, wherein
  the light guiding member further has a diffusion member connected to the second end of the optical fiber, and
  light having exited the second end of the optical fiber is diffused by the diffusion member and enters the first face of the liquid crystal panel.

7. The light source apparatus according to claim 1, further comprising:
  a first sensor configured to detect brightness of an image displayed on the liquid crystal panel; and
  a controller configured to control a driving power of the light source element depending on a detection value of the first sensor.

8. The light source apparatus according to claim 1, further comprising:
- a second sensor configured to detect color temperature of external light entering the first face of the liquid crystal panel from the light guiding member; and
- a controller configured to adjust color of the light source element depending on a detection value of the second sensor.

9. A display apparatus configured to allow a user to visually recognize a virtual image of an image, comprising:
- a light source element configured to emit light;
- a liquid crystal panel located in a progressive direction in a light path of light emitted from the light source element;
- a beam splitter located in the progressive direction of the liquid crystal panel and is inclined relative to a plane vertical to the progressive direction;
- one or more optical members; and
- a light guiding member, wherein
- the liquid crystal panel has a first face where light from the light source element enters and a second face where image projection light resulting from polarization of light having entered the first face in a predetermined polarization direction exits,
- the beam splitter allows the image projection light having exited the second face of the liquid crystal panel and traveling in the progressive direction to pass through, and reflects external light traveling in a retrograde direction opposite to the progressive direction in a direction different from the progressive direction,
- the one or more optical members allow the image projection light having passed through the beam splitter to reach a predetermined region in a real space, and
- the light guiding member is positioned to receive the external light reflected by the beam splitter and to emit the received external light into the liquid crystal panel by way of the first face of the liquid crystal panel.

10. A moving body configured to allow a user to visually recognize a virtual image of an image, comprising:
- a light source element configured to emit light;
- a liquid crystal panel located in a progressive direction in a light path of light emitted from the light source element;
- a beam splitter located in the progressive direction of the liquid crystal panel and is inclined relative to a plane vertical to the progressive direction;
- one or more optical members; and
- a light guiding member, wherein
- the liquid crystal panel has a first face where light from the light source element enters and a second face where image projection light resulting from polarization of light having entered the first face in a predetermined polarization direction exits,
- the beam splitter allows the image projection light having exited the second face of the liquid crystal panel and traveling in the progressive direction to pass through, and reflects external light traveling in a retrograde direction opposite to the progressive direction in a direction different from the progressive direction,
- the one or more optical members allow the image projection light having passed through the beam splitter to reach a predetermined region in a real space, and
- the light guiding member is positioned to receive the external light reflected by the beam splitter and to emit the received external light into the liquid crystal panel by way of the first face of the liquid crystal panel.

11. The moving body according to claim 10, wherein the moving body is a vehicle;
the one or more optical members include a windshield; and
the image projection light is reflected by the windshield and reaches the predetermined region in the real space.

12. The moving body according to claim 11, wherein a polarizing filter is provided on a fourth face, which is different from a third face that reflects the image projection light, of the windshield, the polarizing filter being configured to attenuate or shield a component which is in a same polarization direction as the image projection light out of light entering.

* * * * *